UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

GREEN ANTHRACENE DYE AND PROCESS OF MAKING SAME.

SPECIFICATION forming part of Letters Patent No. 723,125, dated March 17, 1903.

Application filed November 1, 1901. Serial No. 80,835. (Specimens.)

*To all whom it may concern:*

Be it known that I, OSCAR BALLY, doctor of philosophy and chemist, a citizen of the Swiss Republic, residing at Mannheim, in the Grand Duchy of Baden, Germany, have invented new and useful Improvements in Coloring-Matters of the Anthracene Series and Processes of Producing the Same, of which the following is a specification.

According to a previous invention of mine sulfonated coloring-matters of the anthracene series can be obtained by condensing the sulfo-acids of aromatic amido bodies with nitroanthraquinone derivatives. I have now found that these condensation products can easily be transformed into halogen derivatives soluble in water which are of themselves coloring-matters and are also capable of condensing with aromatic amins to form new coloring-matters of various shades. These new halogen bodies can be prepared by treating the aforementioned sulfonated coloring-matters in the condition either of the free acid or of their salts with chlorin or bromin in aqueous solution or suspension or in the dry condition. The condensation of the halogen bodies thus formed with amido bodies can be effected by melting them with the amin chosen, or the solution—for instance, in water—of the halogenized sulfo-acid can be boiled with the amido body for a sufficient length of time or preferably heated under pressure in a closed vessel, whereby the addition of such bodies as sodium acetate or calcium acetate, sodium carbonate, and the like frequently affects the reaction in a favorable manner. The new coloring-matters thus obtained can be employed for dyeing mordanted and unmordanted wool. They are as a rule sufficiently soluble in water for dyeing purposes; but if not they can be further sulfonated in the known manner.

The following examples will serve to further illustrate the nature of my invention and the manner in which the same may be carried into practical effect; but the invention is not confined to these examples. The parts are by weight.

*Example 1. Bromination of the condensation product of 1.8-dinitro-anthraquinone and sodium sulfanilate.*—Dissolve one (1) part of the coloring-matter which can be obtained from 1.8-dinitro-anthraquinone and sodium sulfanilate in thirty (30) parts of water at ordinary temperature and gradually add three (3) parts of bromin while stirring. Continue to stir for twenty-four (24) hours. The bromid thus formed can be precipitated from the solution by means of common salt.

*Example 2. Bromination of the condensation product of mono-nitro-anthraquinone sulfo-acid and sodium sulfanilate.*—Dissolve ten (10) parts of the coloring-matter obtainable from crude mono-nitro-anthraquinone sulfoacid and sodium sulfanilate in two hundred (200) parts of water and treat it at ordinary temperature with eight (8) parts of bromin. When the reaction is ended, salt out the reaction product by means of common salt. The condensation products of beta-nitro-anthraquinone sulfo-acid and sulfanilic acid or of nitro-anthraquinone sulfo-acid and metanilic acid can be treated with bromin in a similar manner.

*Example 3. Chlorination of the condensation product of mono-nitro-anthraquinone sulfo-acid and sodium sulfanilate.*—Dissolve one hundred (100) parts of the coloring-matter used as initial material in the foregoing Example 2 in two thousand (2,000) parts of hydrochloric acid, (containing about thirty-two per cent. of HCl.) To this solution add gradually twenty-four (24) parts of potassium chlorate, taking care that the temperature does not rise above thirty (30°) degrees centigrade. In a short time the color of the solution changes from violet-red to yellow-red. Salt out the chlorination product formed.

Instead of employing the isolated initial material the crude coloring-matter melt can be directly treated with halogens, as set forth in the following example:

*Example 4. Production of the coloring-matter from nitro-anthraquinone sulfo-acid and sodium sulfanilate and chlorination of the same in one operation.*—Heat one hundred (100) parts of crude nitro-anthraquinone sulfo-acid, sixty-five (65) parts of sodium sulfanilate, (containing water of crystallization,) and five hundred (500) parts of water in an autoclave until no more coloring-matter is formed. Dissolve the reaction mass when cold in sixteen hundred (1,600) parts of hydrochloric acid (containing about thirty-two per cent. of HCl) and gradually add a solution of twenty-four (24) parts of potassium chlorate in four hundred (400) parts of water while keeping the temperature below thirty (30°) degrees centigrade. Salt out the chlorinated product formed after twenty-four (24) hours' stirring.

The following table gives some of the properties of some of the halogenized bodies which can be obtained in the manner set forth:

| Halogen derivative. | Solution in— | | | | |
|---|---|---|---|---|---|
| | Water. | Alcohol. | Sulfuric acid, (ninety-six per cent.) | Sulfuric acid (ninety-six per cent.) and boric acid. | Moderately-warm anilin. |
| 1. Brom derivative obtainable according to Example 1. | Red-brown. | Brown-red. | Olive-brown. | Brown-violet. | Fairly soluble; red-brown. |
| 2. Brom derivative obtainable according to Example 2. | Yellowish red. | Yellow-red. | Brown. | Bluish cherry-red. | Hardly soluble. |
| 3. Brom derivative obtainable according to Example 2 from the condensation product of beta-nitro-anthraquinone sulfo-acid and sulfanilic acid. | Yellow-red. | Yellow-red. | Reddish brown. | Bluish cherry-red. | Slightly soluble; red-orange. |
| 4. Brom derivative obtainable according to Example 2 from the condensation product of crude nitro-anthraquinone sulfo-acid and metanilic acid. | Cherry-red. | Red-orange. | Brown-olive. | Bluish cherry-red. | Almost insoluble. |
| 5. Chlor derivative of Example 3. | Yellow-red. | Brown. | Brown. | Fuchsin-red. | Slightly soluble; brown-yellow. |
| 6. Chlor derivative of Example 4. | Fuchsin-red. | Red-yellow. | Brown. | Fuchsin-red. | Hardly soluble. |

*Example 5. Condensation of brom-sulfanilido-anthraquinone sulfo-acid with paratoluidin.*—Heat fifty (50) parts of brom-sulfanilido-anthraquinone-mono-sulfo-acid, (obtainable as described in Example 2,) twenty-five (25) parts of paratoluidin, one hundred (100) parts of calcium-acetate solution, (twenty per cent.,) and six hundred and fifty (650) parts of water in an enameled autoclave at a temperature of one hundred and eighty to two hundred degrees centigrade (180° to 200° centigrade) until no increase in the amount of the coloring-matter formed takes place. Extract the reaction mass with hot alcohol. A difficultly-soluble coloring-matter remains undissolved, which I will call "product A." A product goes into solution, which I will call "product B." It separates from the cold alcoholic solution in crystalline form.

*Example 6. Condensation of chlor-sulfanilido-anthraquinone sulfo-acid with anilin.*—Heat one (1) part of chlor-sulfanilido-anthraquinone sulfo-acid obtainable as described in Example 4, one (1) part of anilin, and five (5) parts of water in an autoclave at a temperature of about one hundred and eighty (180°) degrees centigrade and proceed further as in Example 5. In this case also two coloring-matters are formed, one almost insoluble, the other soluble in alcohol. I will term them "product C" and "product D," respectively.

*Example 7. Sulfonation of "product A" of Example 5.*—Introduce one (1) part of the coloring-matter "product A" obtainable as described in Example 5 into twenty (20) parts of monohydrate sulfuric acid and heat at a temperature of thirty-five (35°) to forty (40°) degrees centigrade until a test sample is easily soluble in water. Dilute the melt with ice-water and salt out the sulfo-acid formed.

The following table indicates some of the properties of some of the coloring-matters obtainable according to my invention:

| Condensation product of— | Appearance. | Behavior toward— | | | | | | Solution in concentrated sulfuric acid, (96%.) | Dyes chrome-mordanted wool. |
|---|---|---|---|---|---|---|---|---|---|
| | | Water. | Sodium carbonate. | Caustic soda. | Alcohol. | Glacial acetic acid. | Nitro-benzene. | | |
| 1. Paratoluidin + brom-sulfanilido-anthraquinone sulfo-acid, (Example 5, coloring-matter A.) | As powder violet-black. | Difficultly soluble. | Insoluble. | | Difficultly soluble blue. | | On boiling fairly easily soluble green-blue. | Violet. | Bright green. |
| 2. Paratoluidin + brom-sulfanilido-anthraquinone sulfo-acid (Example 5, coloring-matter A) sulfonated according to Example 7. | As paste black-green. | Easily soluble green. | Unchanged. | | Fairly soluble green-blue. | | Soluble on boiling; bluish green. | Violet. | Bright green. |
| 3. Coloring-matter B of Example 5. | As powder blue-black. | Easily soluble blackish blue. | Unchanged. | | Hot, soluble violet-blue. | | Hardly soluble green. | Violet. | Greenish gray to black. |
| 4. Anilin + brom-sulfanilido-anthraquinone sulfo-acid, (Example 5.) Less soluble coloring-matter on further sulfonation. | As paste black-green. | Easily soluble bluish green. | Unchanged. | | Hot, fairly soluble blue. | Fairly soluble blue. | Insoluble. | Blue-violet. | Bright green. |
| 5. Coloring-matter C of Example 6. | As paste black-green. | Easily soluble in hot water blue-green. | Becomes greener. | | But slightly soluble on boiling blue. | Boiling easily soluble blue. | Hardly soluble. | Dull blue. | Green. |
| 6. Coloring-matter D of Example 6. | As paste black-green. | Easily soluble black-green. | Becomes greener. | | Hot, soluble blue. | Fairly soluble blue. | But slightly soluble olive. | Blackish violet. | Gray to black-green. |

I do not wish to be understood as limiting myself to the para to the exclusion of the meta variety of the sulfanilate.

Now what I claim is—

1. The process of manufacturing new coloring-matter of the anthracene series by condensing with aromatic amins the halogenized condensation products of nitro-anthraquinone bodies and sulfonated aromatic amins and sulfonating the thus-formed condensation products.

2. The process of manufacturing new coloring-matter of the anthracene series by condensing with aromatic amins the halogenized condensation products of nitro-anthraquinone bodies and sulfonated aromatic amins.

3. The new coloring-matter of the anthracene series which is soluble in alcohol and glacial acetic acid with a bluish color, and in concentrated sulfuric acid with a violet to blue color, which dyes wool mordanted with chrome green to grayish or blackish green shades.

4. The new coloring-matter of the anthracene series such as can be obtained by condensing paratoluidin with a halogenized sulfanilido anthraquinone, which dissolves in water with a green color and in alcohol and in glacial acetic acid with a blue color, which gives a violet color with concentrated sulfuric acid and which on further sulfonation becomes more easily soluble in alcohol and in glacial acetic acid and which in its mono or poly sulfonated form dyes chrome-mordanted wool a green shade.

In testimony whereof I have hereunto set my hand in the presence of two subscribing witnesses.

OSCAR BALLY.

Witnesses:
ERNEST E. EHRHARDT,
JACOB ADRIAN.

---

Correction in Letters Patent No. 723,125.

It is hereby certified that in Letters Patent No. 723,125, granted March 17, 1903, upon the application of Oscar Bally, of Mannheim, Germany, for an improvement in "Green Anthracene Dye and process of making same," an error appears in the printed specification requiring correction, as follows: In lines 26–7, page 3, the word "Sulfanilido" should read *Sulfoanilido;* and that the said Letters Patent should be read with this correction therein that the same may conform to the record of the case in the Patent Office.

Signed and sealed this 6th day of October, A. D., 1903.

[SEAL.]

F. I. ALLEN,
*Commissioner of Patents.*

I do not wish to be understood as limiting myself to the para to the exclusion of the meta variety of the sulfanilate.

Now what I claim is—

1. The process of manufacturing new coloring-matter of the anthracene series by condensing with aromatic amins the halogenized condensation products of nitro-anthraquinone bodies and sulfonated aromatic amins and sulfonating the thus-formed condensation products.

2. The process of manufacturing new coloring-matter of the anthracene series by condensing with aromatic amins the halogenized condensation products of nitro-anthraquinone bodies and sulfonated aromatic amins.

3. The new coloring-matter of the anthracene series which is soluble in alcohol and glacial acetic acid with a bluish color, and in concentrated sulfuric acid with a violet to blue color, which dyes wool mordanted with chrome green to grayish or blackish green shades.

4. The new coloring-matter of the anthracene series such as can be obtained by condensing paratoluidin with a halogenized sulfanilido anthraquinone, which dissolves in water with a green color and in alcohol and in glacial acetic acid with a blue color, which gives a violet color with concentrated sulfuric acid and which on further sulfonation becomes more easily soluble in alcohol and in glacial acetic acid and which in its mono or poly sulfonated form dyes chrome-mordanted wool a green shade.

In testimony whereof I have hereunto set my hand in the presence of two subscribing witnesses.

OSCAR BALLY.

Witnesses:
ERNEST E. EHRHARDT,
JACOB ADRIAN.

---

It is hereby certified that in Letters Patent No. 723,125, granted March 17, 1903, upon the application of Oscar Bally, of Mannheim, Germany, for an improvement in "Green Anthracene Dye and process of making same," an error appears in the printed specification requiring correction, as follows: In lines 26–7, page 3, the word "Sulfanilido" should read *Sulfoanilido;* and that the said Letters Patent should be read with this correction therein that the same may conform to the record of the case in the Patent Office.

Signed and sealed this 6th day of October, A. D., 1903.

[SEAL.]

F. I. ALLEN,
*Commissioner of Patents.*

Correction in Letters Patent No. 723,125.

It is hereby certified that in Letters Patent No. 723,125, granted March 17, 1903, upon the application of Oscar Bally, of Mannheim, Germany, for an improvement in "Green Anthracene Dye and process of making same," an error appears in the printed specification requiring correction, as follows: In lines 26-7, page 3, the word "Sulfanilido" should read *Sulfoanilido;* and that the said Letters Patent should be read with this correction therein that the same may conform to the record of the case in the Patent Office.

Signed and sealed this 6th day of October, A. D., 1903.

[SEAL.]

F. I. ALLEN,
*Commissioner of Patents.*